United States Patent [19]

Taube, Sr. et al.

[11] Patent Number: 4,924,900
[45] Date of Patent: May 15, 1990

[54] ADJUSTABLE RATIO MIXING VALVE

[75] Inventors: Frank A. Taube, Sr., Birmingham; Edward J. Rozniecki, St. Clair Shores, both of Mich.

[73] Assignee: Systems Specialties, Royal Oak, Mich.

[21] Appl. No.: 227,644

[22] Filed: Aug. 2, 1988

[51] Int. Cl.⁵ .......................................... G05D 11/00
[52] U.S. Cl. .................................. 137/101; 137/118; 137/613
[58] Field of Search ............... 137/100, 101, 118, 613, 137/637, 637.1

[56] References Cited

U.S. PATENT DOCUMENTS

| | | | |
|---|---|---|---|
| 1,989,248 | 1/1935 | Scott | 277/20 |
| 2,267,976 | 12/1941 | Hermann | 236/12 |
| 2,417,158 | 3/1947 | Fraser | 137/100 |
| 2,443,499 | 6/1948 | Fraser | 277/18 |
| 2,470,025 | 5/1949 | Fraser | 277/18 |
| 2,682,276 | 6/1954 | Fraser | 137/100 |
| 2,775,259 | 12/1956 | Stiebel | 137/599.1 |
| 2,808,848 | 10/1957 | Cooper | 137/100 |
| 2,817,352 | 12/1957 | Barten et al. | 137/108 |
| 3,010,467 | 11/1961 | Stenberg | 137/114 |
| 3,204,653 | 9/1965 | Hettlinger | 137/111 |
| 3,356,101 | 12/1967 | Tacchi | 137/114 |
| 3,370,753 | 2/1968 | Yingst et al. | 222/129.1 |
| 3,386,458 | 6/1968 | Wasserman et al. | 137/114 |
| 3,426,784 | 2/1969 | Vick | 137/99 |
| 3,455,320 | 7/1969 | Garman | 137/101 |
| 3,489,162 | 1/1970 | Meynell | 137/100 |
| 3,586,029 | 6/1971 | Evers | 137/100 |
| 3,604,444 | 9/1971 | Tacchi | 137/111 |
| 3,605,784 | 9/1971 | Bowman | 137/100 |
| 3,662,773 | 5/1972 | Nicolas | 137/100 |
| 3,717,177 | 2/1973 | Glesmann | 137/607 |
| 3,724,480 | 4/1973 | Povalski et al. | 137/607 |
| 3,746,048 | 7/1973 | Harper | 137/628 |
| 3,916,931 | 11/1975 | Shaw et al. | 137/101 |
| 3,921,659 | 11/1975 | Rudewick, III | 137/98 |
| 3,929,281 | 12/1975 | Woodward | 137/613 |
| 4,083,474 | 4/1978 | Waite et al. | 137/114 |
| 4,148,311 | 4/1979 | London et al. | 137/111 |
| 4,150,684 | 4/1979 | Kervin | 137/111 |
| 4,224,956 | 9/1980 | Klein | 137/114 |
| 4,228,958 | 10/1980 | Perry | 137/114 |
| 4,266,573 | 5/1981 | Braatz | 137/607 |
| 4,286,749 | 9/1981 | Oguma | 137/111 |
| 4,402,336 | 9/1983 | Kalmanczhelyi et al. | 137/101 |
| 4,465,089 | 8/1984 | Inhofer | 137/101 |
| 4,473,088 | 9/1984 | Dotter | 137/111 |
| 4,531,536 | 7/1985 | Kosarzecki | 137/111 |
| 4,546,794 | 10/1985 | Ball | 137/607 |

FOREIGN PATENT DOCUMENTS 1162583 8/1969 United Kingdom .
1274369 5/1972 United Kingdom .
1422165 1/1976 United Kingdom .

Primary Examiner—A. Michael Chambers
Attorney, Agent, or Firm—Harness, Dickey & Pierce

[57] ABSTRACT

An adjustable ratio mixing valve is disclosed which incorporates an automatic pressure compensating arrangement whereby the fluid pressure immediately upstream of each of the metering orifices is maintained in substantial equilibrium. This arrangement then enables the respective fluids to be intermixed in any desired volumetric ratio by merely suitably adjusting the open flow area of the metering orifices. In one embodiment the metering orifices are each externally adjustable to enable relatively easy changes in the mixing ratio to be made and may also be interconnected whereby flow volume may be changed while maintaining the desired present mixing ratio. In another embodiment, rapidly acting on/off valving is provided integral with the valve so as to render it uniquely suited for cyclic fluid flow.

29 Claims, 3 Drawing Sheets

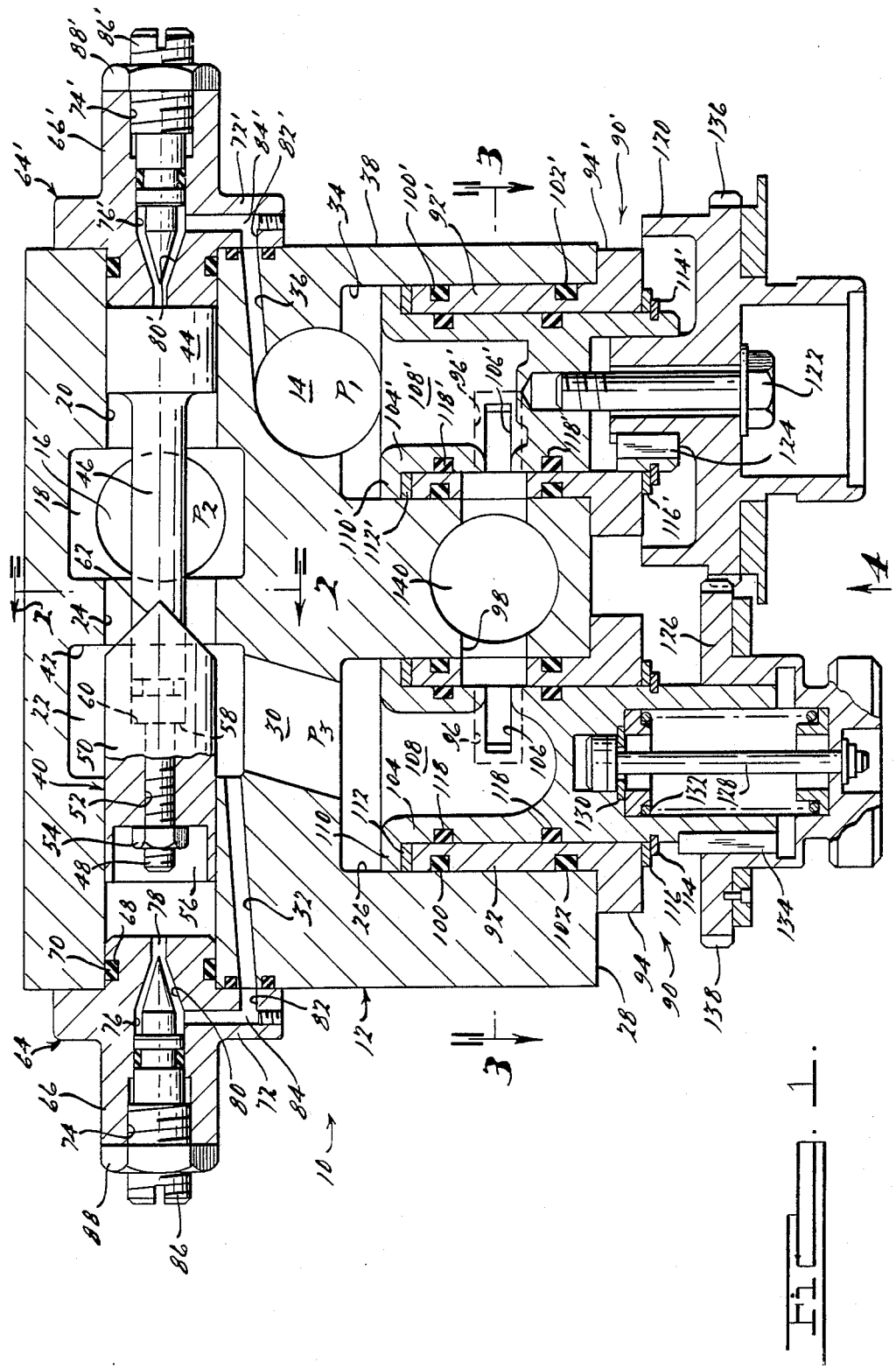

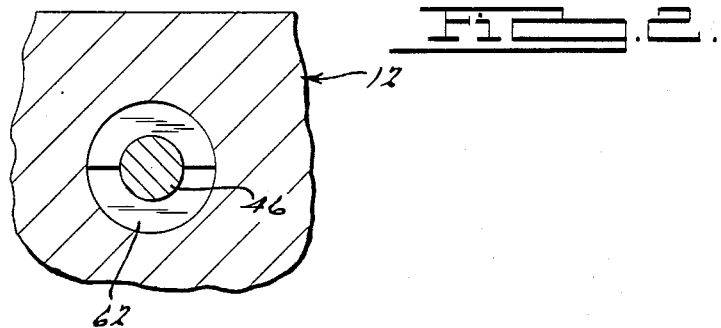
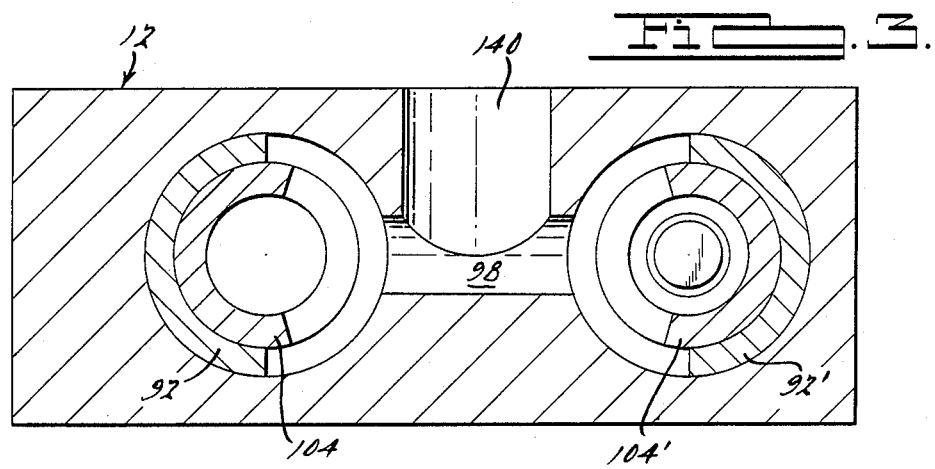
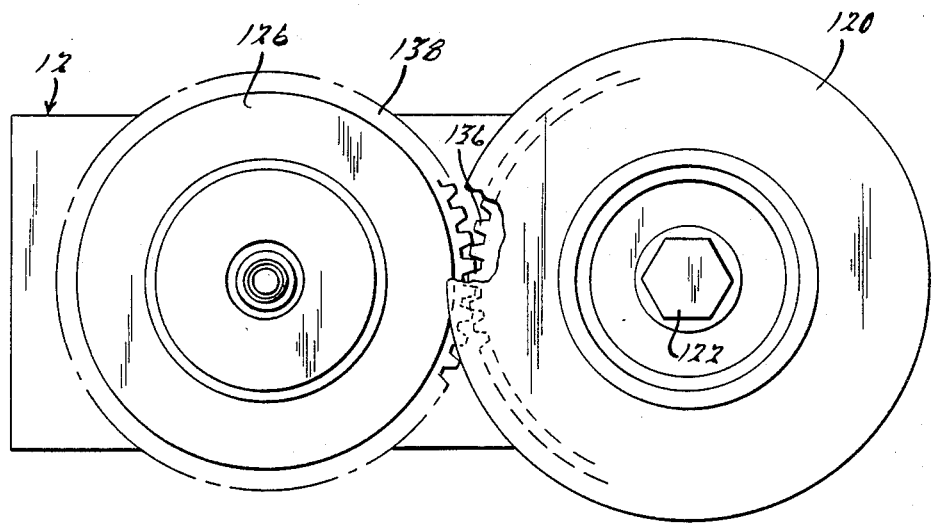

ADJUSTABLE RATIO MIXING VALVE

BACKGROUND AND SUMMARY OF THE INVENTION

The present invention relates generally to flow control valves and more specifically to such valves which are specifically designed for use in mixing of multiple fluids at predetermined and accurately controlled rates.

There exist a wide variety of applications wherein it is necessary to combine two or more fluids for subsequent use. Examples of but a few of such applications include mixing of paints, solvents and/or thinners; ethylene glycol and water; beverage components; gasoline or other fuels with additives; introduction of an odiferous gas to natural gas being delivered to consumers etc. While presently available means exist currently to properly meter flow rates of two or more fluids whereby a desired mixing ratio may be achieved, these means are not totally acceptable as they generally operate independently of each other and hence may not achieve the desired degree of accuracy under varying inlet and outlet pressures. Further, such arrangements are often relatively complex and hence costly both in terms of initial installation costs as well as in the cost of maintenance and operation thereof.

The present invention, however, overcomes these disadvantages in providing an exceedingly accurate, relatively uncomplicated ratio mixing valve which is capable of maintaining the desired preset mixing ratio without regard to variations in inlet and outlet fluid pressures. Further, the mixing valve of the present invention incorporates an arrangement whereby the flow rate of the mixed fluids may be easily and conveniently varied depending upon demand therefor while continuously maintaining the desired mixing ratio. Alternatively, should it be desirable to adjust the mixing ratio, this may also be easily and conveniently accomplished.

The mixing valve of the present invention combines a variable orifice which operates to meter a first fluid flow in response to changes in the inlet pressure of a second fluid as compared to the pressure of the first fluid measured or sensed downstream of the first variable orifice. This arrangement serves to insure that the fluid pressures of the two fluids immediately prior to being intermixed are maintained substantially equal at all times. A pair of linearly adjustably fixed metering orifices are also provided which operate to control the flow of the respective fluids into a mixing chamber and associated outlet port. Suitable dampening means are also provided to inhibit excessive oscillation of the variable orifice as well which dampening means may be adjustable if desired. A drive arrangement is also incorporated with the adjustably fixed orifices which, because the orifices are linear, is able to insure the desired mixing ratio is maintained while the flow rate of the mixed fluid is increased or decreased.

Additional advantages and features of the present invention will become apparent from the subsequent description and the appended claims taken in conjunction with the accompanying drawings.

BRIEF DESCRIPTION OF THE DRAWINGS

FIG. 1 is a section view of the ratio mixing valve in accordance with the present invention;

FIG. 2 is a fragmentary section view of the first variable metering orifice incorporated in the mixing valve of FIG. 1, the section being taken along line 2—2 thereof;

FIG. 4 is an end view of the ratio mixing valve of FIG. 1 as seen looking in the direction of arrow 4 therein; and FIG. 5 is a section view similar to that of FIG. 1 but showing another embodiment of a ratio mixing valve all in accordance with the present invention.

DESCRIPTION OF THE PREFERRED EMBODIMENTS

Figure 3:
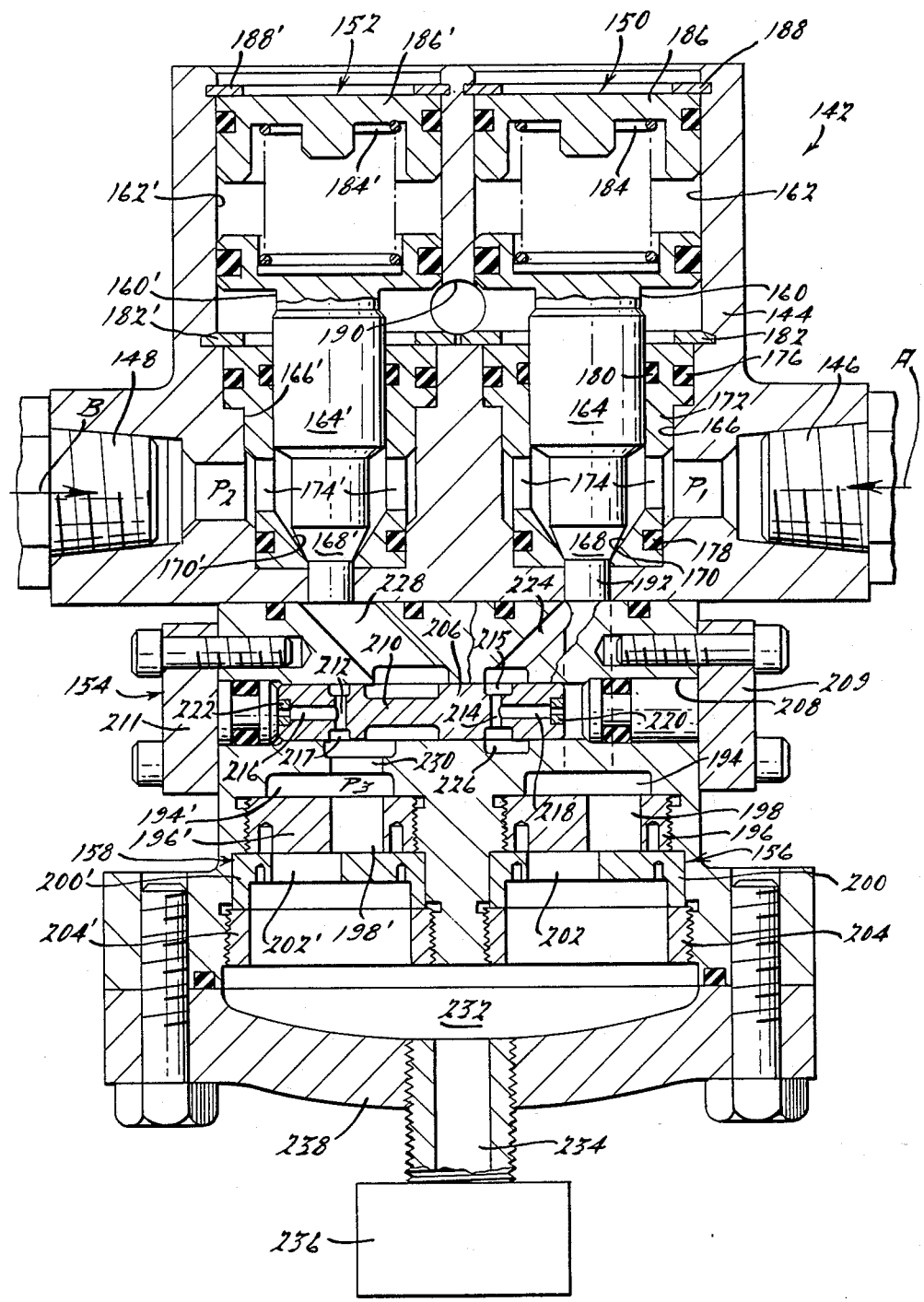
FIG. 3 is a section view of the adjustably fixed orifice arrangement incorporated in the ratio mixing valve of FIG. 1, the section being taken along line 3—3 thereof.

Referring now to the drawings and more specifically to FIG. 1, there is shown a ratio mixing valve 10 in accordance with the present invention. Mixing valve 10 comprises a housing 12 having inlet ports 14 and 16 for admitting first and second fluids which are to be mixed in a predetermined ratio. Each of these inlets will be adapted to enable suitable supply lines (not shown) to be connected thereto to conduct the respective fluids from a pressurized reservoir or the like.

As shown in FIG. 1, inlet port 16 opens into an enlarged diameter chamber portion 18 of an elongated bore 20 extending laterally through housing 12 and opening outwardly from opposite ends thereof adjacent one end of housing 12. A second enlarged diameter chamber portion 22 is also provided in bore 20 being axially spaced from chamber 18 by land 24 of bore 20.

A relatively large diameter bore 26 extends inwardly from sidewall 28 of housing 12. A passageway 30 of a diameter substantially less than bore 26 extends inwardly from the inner end thereof and opens into chamber 22 through a sidewall thereof. Additionally, a relatively small diameter passageway 32 extends in generally parallel slightly radially spaced relationship to bore 20 and opens outwardly of housing 12 immediately adjacent to bore 20.

A second relatively large diameter bore 34 which is substantially identical to bore 26 also extends inwardly from sidewall 28 of housing 12 in generally parallel spaced relationship to bore 26 and to a depth sufficient that the inner end opens into inlet passage 14. Additionally, a relatively small diameter passage 36 extends outwardly from inlet port 14 in generally parallel radially spaced relationship to bore 20 and opens outwardly through sidewall 38 immediately adjacent to bore 20.

An elongated spool assembly 40 is axially movably disposed within bore 20 and cooperates with end wall 42 of chamber 22 to define a variable metering orifice as described in greater detail below. Spool assembly 40 comprises a first member having a generally cylindrically shaped relatively short end portion 44 positioned adjacent one end of bore 20. An elongated centrally located shaft portion 46 extends axially from cylindrical portion 44 along bore 20 and includes a threaded end portion 48. A second elongated generally cylindrically shaped member 50 has an axial bore 52 extending therethrough in which is received shaft portion 46. A nut 54 disposed within a recess 56 provided on the outer axial end of member 50 threadedly engages threaded end portion 48 of shaft portion 46 and cooperates with the engagement between shoulder 58 on shaft portion 48 and shoulder 60 disposed within bore 52 in member 50 to thereby clamp the assembly together. A suitable O-ring seated within a groove provided on shaft 46 adjacent shoulder 58 serves to effectively prevent fluid leakage through bore 52.

Preferably member 50 and end portion 44 of spool assembly 40 will have a diameter to insure a close fit within bore 20 so as to minimize fluid leakage thereacross but yet with sufficient clearance to insure spool assembly 40 will be freely and easily axially movable therein.

The inner end 62 of member 50 is machined to impart a generally "V" shaped configuration thereto generally as shown with the apex of the V extending diametrically across member 50. This V-shaped end portion cooperates with sidewall 42 to define a variable orifice thereacross the size of which will depend upon the axial positioning of spool assembly 40. Preferably, the apex of the V-shaped end 62 will project toward portion 44 and will be axially positioned so as to extend slightly into the area defined by land 24 when spool assembly 40 is moved fully to the left (as shown) extreme position. This positioning serves to provide a guide arrangement to insure that the radially outer corners of the apex will not engage or hand up on sidewall 42 and thus impede or impair the operation of spool assembly 40. The relative angulation between the sidewalls of V-shaped end portion 62 may be selected so as to provide varying degrees of sensitivity to the metering action of this variable orifice. For example, a relatively small included angle will result in very long sidewalls and hence require a relatively long axial travel of spool assembly 40 for the variable orifice to move from a minimum to maximum flow area. Hence, a high degree of sensitivity will be provided. Similarly, a large included angle will result in relatively short sidewalls and hence a slight axial movement of spool assembly 40 will result in a substantial change in the open area of the variable orifice. It should also be noted that the length of travel of spool assembly 40 should be limited such that the variable orifice defined by sidewall 42 and end portion 62 will always be slightly open to enable a minimum fluid flow from inlet 16.

In order to seal off opposite ends of bore 20, a pair of substantially identical closure members 64 and 64' are provided, only one of which will be described in detail corresponding portions of the other being indicated by like numbers primed. Closure member 64 comprises a generally cylindrically shaped elongated body portion 66 one end of which is sized to extend slightly into bore 20 and includes an annular groove 68 into which is fitted O-ring 70 which serves to create a sealing relationship with the sidewalls of bore 20. An enlarged diameter radially outwardly projecting flange portion 72 is provided intermediate the ends of body portion 66 and serves to accommodate suitable securing means such as bolts (not shown) threadedly engaging suitable openings in housing 12. A threaded bore 74 extends axially inwardly from the outer end of body portion 66 and opens into a reduced diameter portion 76 which in turn communicates with a relatively small diameter bore 78 opening into bore 20 via a frusto conical shaped valve seat portion 80. A relatively short axially extending passage 82 is provided in flange portion 72 which serves to place passage 32 in fluid communication with bore 76 via radially extending passage 84. A needle valve 86 is threadedly disposed within bore 74 and cooperates with frusto conical shaped valve seat portion 80 to regulate fluid communication between bore 20 and chamber portion 22. A jam nut 88 is provided on needle valve 86 in order to lock it in a desired position.

A pair of adjustable orifice assemblies 90 and 90' are fitted within bores 26 and 34 respectively. Adjustable orifice assemblies 90 and 90' are substantially identical in many respects and hence such corresponding portions will be indicated by the same reference numbers primed, it being understood that the following description is equally applicable to such corresponding portions. Orifice assemblies 90 and 90' each include a generally cylindrically shaped sleeve 92, 92' of a length less than respective bores 26 and 34 and including a radially outwardly extending flange portion 94, 94' at one end thereof which is designed to accommodate suitable fastners such as bolts (not shown) threaddedly engaging housing 12 so as to secure adjustable orifice assemblies 90, 90' in assembled relationship therewith. A circumferentially extending slot 96, 96' of substantial axial width is provided in the sidewalls of sleeves 92, 92' each of which extends through an arc of approximately 180° with the midpoint thereof being positioned so as to intersect the axis of laterally extending passageway 98 in housing 12 which passageway extends between and interconnects bores 26 and 34. Also preferably, the axial width of slots 96, 96' will be approximately equal to the diameter of passageway 98. Suitable O-rings 100, 100', 102, 102' are provided seated within annular grooves provided on sleeves 92, 92' adjacent opposite axial sides of slots 96, 96' so as to create a fluid tight sealing relationship with the sidewalls of respective bores 26, 34.

Orifice sleeves 104, 104' are rotatably fitted within respective sleeves 92, 92' and include slots 106, 106' extending circumferentially through an arc slightly less than that of slots 96, 96'. Slots 106, 106' are axially positioned on orifice sleeves 104, 104' so that the opposite axial edges thereof are within the open area defined by slots 96, 96' and open into axial extending counterbores 108, 108' provided in sleeves 92, 92' which in turn open into the inner ends of bores 26 and 34 respectively. Preferably, as shown, the juncture between the sidewall of counterbores 108, 108' and respective slots 106, 106' will be slightly radiused so as to promote relatively smooth fluid flow therethrough with a minimum of turbulence.

In order to axially retain orifice sleeves 104, 104' in position within sleeves 92, 92' respectively and still allow relatively free rotation thereof, radially outwardly extending annular flanges 110, 110' are provided on the inner ends of orifice sleeves 104, 104' and overlie the inner ends of sleeves 92, 92' with suitable thrust washers 112, 112' being disposed therebetween. Similarly, suitable snap rings 114, 114' and thrust washers 116, 116' are provided adjacent the outer end of orifice sleeves 104, 104' which engage the outer end of sleeves 92, 92'. Suitable O-rings 118 are provided adjacent opposite axial edges of slots 106, 106' in order to prevent fluid leakage between orifice sleeves 104, 104' and respective sleeves 92, 92'.

In order to effect rotational movement of orifice sleeve 104' within sleeve 92', a suitable actuating knob 120 is provided being secured to the outer end of orifice sleeve 104' by means of bolt 122 extending therebetween. A suitable dowel pin 124 may be interposed between knob 120 and orifice sleeve 104' to effectively prevent relative rotation therebetween.

Orifice sleeve 104 is also provided with a knob 126 axially slidably fitted to an extended outer end portion of orifice sleeve 104 by means of bolt 128 extending therebetween. The inner end of bolt 128 is retained within a suitable recess by means of a snap ring 130 and serves also to limit axial outward movement of knob 126. A spring 132 extends between knob 126 and orifice sleeve 104 and serves to bias knob 126 axially outwardly with respect to orifice sleeve 104. A suitable dowel pin 134 is disposed between knob 126 and orifice sleeve 104 to prevent relative rotation therebetween.

In order to maintain the relative ratio of fluid flow through the two orifice sleeves while allowing for changes in the volume thereof, knobs 120 and 126 are each provided with annular radially extending flanges the outer peripheries of which are provided with gear teeth 136, 138 positioned to meshingly engage each other when knob 126 is in its axially outwardly biased position as shown. Thus, as either of knobs 120 or 126 is rotated, the other knob will be rotatably driven by means of the meshing gear teeth a like amount. Because slots 96, 96' and 106, 106' are rectangular in developed shape, the rate of change of the open area flowpath defined thereby will be constant over the entire range of operation and hence the flow volume will be linearly variable. That is to say, that for one degree of rotation of orifice sleeves 104, 104', the change in open area defined by the respective slots will be the same regardless of the relative rotational position of sleeves 104, 104' with respect to sleeves 92, 92'. Hence, by selecting the relative axial widths of slots 106, 106' such as to provide the desired mixing ratio of the two fluids, the total flow volume may be easily controlled by merely rotating either of knobs 120 or 126 which will effect a similar rotation of the other knob. Alternatively, of course, the axial widths of slots 106, 106' may be identical in which case the mixing ratio will be varied by rotating only one of the knobs which will in turn rotatably drive the other. Suitable indicia may be provided on knobs 120, 126 to provide a visible readout of the ratio being set. It should also be noted that automatic drive means may be easily substituted for the manual adjustment described to accommodate remote operation.

In operation, first and second pressurized fluids to be mixed in some predetermined ratio are supplied to ratio mixing valve 10 via inlets 14 and 16 at pressures $P_1$ and $P_2$ respectively. Preferably, suitable rapid acting on/off valves will be incorporated in each of the supply lines feeding inlets 14 and 16 as well as the discharge line connected to discharge port 140 all of which will be actuated simultaneously. Passageways 36, 82' and 84' will conduct the fluid entering inlet 14 to the right end (as shown) of bore 20 where pressure $P_1$ will act against the axially outwardly facing surface of cylindrical portion 44 of spool assembly 40 where it will exert a biasing force on spool assembly 40 to the left as shown.

The second fluid entering inlet 16 at pressure $P_2$ will flow across this variable metering orifice defined by the beveled end surfaces 62 of spool assembly 40 and end wall 42 into chamber 22 and passageway 30. A pressure drop will occur as a result of fluid flow across this variable metering orifice and hence the second fluid in passageway 30 will have a pressure $P_3$ which is less than pressure $P_2$. Passageways 32, 82, 84, 76, 80 and 78 will serve to conduct this second fluid at pressure $P_3$ to the left end (as shown) of bore 20 where pressure $P_3$ will exert a biasing action on spool assembly directed to the right. As the surface areas against which pressures $P_1$ and $P_3$ act are equal and spool assembly is freely movable axially within bore 20, pressures $P_1$ and $P_3$ will, if not equal, effect movement of spool assembly toward the lower of the two pressures which in turn will change the area of the variable metering orifice and hence the pressure drop thereacross until an equilibrium is reached wherein $P_1 = P_3$. It should be noted that because the fluid entering inlet 16 must flow through the variable metering orifice, it is necessary that $P_2$ be greater than $P_1$ by an amount sufficient to compensate for the pressure drop occurring across the variable orifice. Preferably, this difference will be at least 4 psi although it may be greater or less than this. It should also be noted that the axial surface areas of spool assembly 40 upon which fluid entering inlet 16 will act at pressure $P_2$ will be such that the axially directed forces resulting therefrom will substantially cancel each other except possibly for some dynamic fluid forces resulting from fluid flow across the variable orifice. It is presently believed that these forces may result in some dither of spool assembly 40 which may aid in assuring free responsive movement thereof to compensate for any inlet pressure variations.

In the event the inlet pressure of either or both fluids should change, the spool valve assembly will be moved to a new position whereby the variable orifice will modulate the pressure drop thereacross such that $P_3$ will again equal $P_1$. In some cases, it may be desirable to induce a time delay in the reaction time required to compensate for a change in $P_1$ or $P_2$ such as for example to dampen undue oscillation thereof or to compensate for fluids of different viscosity. This time delay can easily be adjusted by repositioning either or both needle valves, 86, 86' so as to thereby vary the flow rate of fluid into or out of the respective ends of bore 20.

From inlet 14, the first fluid will flow through bore 108' and slots 106' and 96' into passage 98 and then out through discharge port 140. Similarly, the second fluid will flow from passageway 30 through bore 108, slots 96 and 106 into passage 98 where it will mix with the first fluid and exit via discharge port 140. As pressures $P_1$ and $P_3$ are maintained equal by the action of spool valve assembly 40 as described above and the back pressure of the mixed fluid is the same for both fluids, the volume of flow of each of the two fluids will be directly proportional to the free area defined by overlapping slots 96, 106 and 96', 106'. Hence, the two fluids may be combined or mixed at any desired ratio by appropriately rotating the orifice sleeves 104, 104' relative to the associated sleeves 92, 92' so as to position slots 106 and 106' in the desired degree of overlap with respective slots 96 and 96'.

Referring now to FIG. 5, there is shown another embodiment of a ratio mixing valve in accordance with the present invention being indicated generally by reference number 142. Ratio mixing valve 142 incorporates a two piece main housing 144 having first and second fluid inlets 146, 148, first and second rapidly acting on/off flow valve assemblies 150, 152, a variable orifice metering spool valve assembly 154 and first and second fixed orifice assemblies 156, 158.

On/off valve assemblies 150, 152 are substantially identical and hence only one will be described in detail with corresponding portions of the other being indicated by like numbers primed. Valve assembly 150 comprises a piston member 160 movably disposed within cylinder 162 provided in housing 144 which includes a depending shaft portion 164 extending into a reduced diameter continuation portion 166 of cylinder 162. A frusto conically shaped valve member 168 is provided on the terminal end of shaft portion 164 and mates with a conical valve seat 170 provided on insert 172 fitted within portion 166 of cylinder 162. Suitable openings 174 are provided in insert 172 positioned so as to place the interior thereof in fluid communication with inlet port 146. Additionally, insert 172 is provided with suitable seals such as O-rings 176, 178 seated within annular grooves which adjacent opposite ends thereof to effectively prevent fluid leakage between insert 172 and the sidewalls of portion 166 of cylinder 162. An additional O-ring seal 180 is provided on insert 172 which slidably engages an intermediate portion of shaft 164 to create a sealing relationship therebetween. In order to retain insert 172 in position, a snap ring is fitted 182 within an annular groove at the juncture of reduced diameter portion 166 and cylinder 162.

In order to maintain valve 168 in a closed position, a helical coil spring 184 is provided extending between an upper portion of piston 160 and a spring seat member 186. Another snap ring 188 serves to retain spring seat 186 within cylinder 162. Preferably pistons 160 and 160' will both be designed for simultaneous actuation by either hydraulic or pneumatic fluid pressure and to this end a common inlet 190 is provided in housing 144 which communicates with the inner portions of cylinders 162 and 162'. Alternatively, of course, valves 168, 168' may be electrically operated via a suitable solenoid arrangement.

A fluid passage 192 is provided in housing 144 extending from the downstream side of valve 168 to a chamber 194 within which is disposed fixed orifice assembly 156. Fixed orifice assembly 156 comprises a first threaded plate member 196 having an eccentric opening 198 extending therethrough and a second plate member 200 also having an eccentric opening 202 extending therethrough positioned in partially overlapping relationship with eccentric opening 198 so as to define a fixed orifice flowpath therethrough. A threaded retainer ring 204 is also provided which serves to lock plate member 200 in the desired circumferential orientation as well as to retain it in a fluid tight abutting relationship with threaded plate member 196.

Fixed orifice assembly 158 is substantially identical to fixed orifice assembly 156, corresponding portions thereof have been indicated by like numbers primed.

Variable orifice assembly 154 comprises a spool valve 206 movably disposed within a bore 208 extending laterally through housing 144. The opposite ends of bore 208 are sealed off by suitable closure members 209, 211 which also includes projections extending into bore 208 which operate to limit movement of spool valve 206. Spool valve includes a reduced diameter center portion 210 and a pair of diametrically extending passages 212, 214 adjacent opposite ends thereof which open outwardly into annular grooves 215, 217. Centrally disposed axial passages 216, 218 extend inwardly from opposite ends of spool valve 206 and open into respective passages 212, 214. Inserts 220 and 222 are fitted within the outer ends of each of the axial passages 216, 218 and have an orifice defining opening extending therethrough of a size smaller than the diameter of passages 216, 218. A fluid passage 224 extends from passage 192 to an annular groove 226 provided in the sidewall of bore 208. As shown, annular grooves 215 and 226 are positioned relative to each other so as to assure fluid communication therebetween regardless of the axial position of spool valve 206.

Housing 144 also contains a fluid passage 228 extending from the downstream side of valve member 168' to one side of bore 208 and a second relatively short fluid passage 230 extending from the opposite side of bore 208 to chamber 194'. As shown, passages 228 and 230 open into bore 208 on diametrically opposed sides thereof and are slightly axially displaced from each other although both overlap and communicate with the space defined by reduced diameter portion 210. As spool valve 206 is moved to the right as shown in FIG. 5, it will be noted that the left sidewall of reduced diameter portion 210 will reduce the area of communication between passages 228 and 230 thereby increasing the pressure drop thereacross. Similarly movement of spool valve to the left will increase the area of communication between passages 228 and 230 thereby decreasing the pressure drop across this thus defined variable orifice.

Openings 202 and 202' both open into a common discharge chamber 232 from which a single discharge port 234 opens outwardly for supplying the now mixed fluids for use. Preferably, a rapid acting on/off valve 236 similar to valves 150, 152 will be provided at discharge port 234 which will operate simultaneously with on/off valves 150 and 152.

In operation, when the mixed fluids are required each of the on/off valves 150, 152, and 236 will be simultaneously actuated to an open position thereby enabling a first fluid A to enter via port 146 at pressure $P_1$ and a second fluid B to be mixed therewith to enter port 148 at pressure $P_2$. As with adjustable ratio mixing valve 10, pressure $P_2$ must be slightly higher than pressure $P_1$, preferably at least 4 psi although higher or lower differentials may be utilized. It should be noted, however, that if fluid B is a gas, its pressure must be less than twice the inlet pressure $P_1$ of fluid A so as to avoid the possibility of sonic flow within valve 142.

Fluid A will flow through passage 192 into chamber 194 and then through the metering orifice defined by overlapping openings 198 and 202 and into discharge chamber 232. Additionally, the pressure $P_1$ of fluid A will be communicated to and act against the right end surface of spool valve 206 via passage 224, grooves 226 and 215, passages 214 and 218 and the opening in orifice insert 220. The force resulting from this pressure $P_1$ will tend to urge spool valve to the left as seen in FIG. 5.

Fluid B will flow through passage 228 across the variable orifice defined by reduced diameter portion 210 and the opening of passage 230, through passage 230, through the metering orifice defined by overlapping openings 198' and 202' and into discharge chamber 232 where it will mix with fluid A and exit via discharge port 234. A pressure drop will occur as fluid B flows across the variable orifice such that fluid B will have a pressure $P_3$ at passage 230. This pressure will be communicated to and act against the left end surface of spool valve 206 via passages 212, 216 and the opening in orifice insert 222 so as to urge spool valve to the right as shown in FIG. 5. As the opposite end surfaces of spool valve 206 are substantially identical in size, it will move either to the right or left as viewed in FIG. 5 so as to thereby modulate the pressure drop across the variable orifice until such time as pressure $P_3$ is equal to pressure $P_1$. Thereafter any variations in either inlet pressures $P_1$ or $P_2$ will result in a repositioning of spool valve 206 and hence a modulation of the pressure drop across the variable orifice such that $P_3$ will once again be equal to $P_1$. Orifice inserts 220 and 222 will serve substantially the same function as needle valves 86, 86' described above. As each of the fixed orifices defined by overlapping openings 198, 202 and 198' and 202' open into a common discharge chamber 232 and are thus subject to the same fluid back pressure and $P_3$ is equal to $P_1$ immediately upstream therefrom, the flow volume thereacross will be directly proportional to the open area of the respective orifices. Hence, they may be easily and conveniently set by rotating orifice plates 200 and 200' to provide for the desired mixing ratio of fluids A and B. Once this desired ratio has been set, retaining rings 204 and 204' may be tightened so as to securely lock respective orifice plates 200, 200' in position relative to orifice plates 196, 196' whereupon end plate 238 may be secured to housing 144.

As may now be appreciated, each of the adjustable ratio mixing valves disclosed above is well suited to provide an accurately controlled mixing of two fluids without regard to variations in inlet pressures. These valves are well suited for mixing a wide variety of fluids including liquid, liquid; gas, liquid; or gas, gas. Adjustable ratio mixing valve 10 is ideally suited for applications wherein it is desirable to be able to adjust the flow rate from time to time as well as applications wherein periodic changes to the mixing ratio may be required as this valve incorporates easily accessible means for adjusting the fixed orifices. Adjustable ratio mixing valve 142 is ideally suited for applications requiring cyclic flow such as mixing of paint for spray application or the like as it incorporates integral rapid acting on/off valving in addition to the ratio mixing arrangement. It should be noted, however, that adjustable ratio mixing valve 10 may also be utilized in such cyclic flow situations by merely incorporating suitable rapid acting on/off valving immediately adjacent inlet ports 14 and 16 and discharge port 140.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. An adjustable ratio mixing valve for mixing first and second fluids together in a predetermined ratio comprising:
    a housing having first and second fluid inlets and a fluid outlet;
    a first adjustable orifice within said housing for metering fluid flow entering from said first inlet;
    a second adjustable orifice within said housing for metering fluid flow entering from said second inlet;
    means within said housing defining a variable orifice, said variable orifice being disposed in a fluid flowpath between said second inlet and said second adjustable orifice, said variable orifice being operative to maintain a predetermined desired relationship between the pressure of said fluid entering said first inlet immediately upstream of said first adjustable orifice and the pressure of said fluid entering said second inlet between said variable orifice and said second adjustable orifice whereby said first and second adjustable orifices may operate to maintain a predetermined ratio at said fluid outlet between said fluid entering said first inlet and said fluid entering said second inlet.

2. A mixing valve as set forth in claim 1 wherein said variable orifice is varied in response to changes in the inlet pressure of said first fluid.

3. A mixing valve as set forth in claim 2 wherein said variable orifice is varied in response to changes in the pressure of said second fluid.

4. A mixing valve as set forth in claim 1 wherein said variable orifice comprises a spool valve movably disposed within a bore provided in said housing.

5. A mixing valve as set forth in claim 4 wherein one end of said bore is in fluid communication with said first inlet and the opposite end of said bore is in fluid communication with said second fluid immediately upstream of said second adjustable orifice.

6. A mixing valve as set forth in claim 5 further comprising first means for restricting flow of said first fluid into and out of said one end of said bore and second means for restricting flow of said second fluid into and out of said opposite end of said bore.

7. A mixing valve as set forth in claim 6 wherein said first and second restricting means are adjustable.

8. A mixing valve as set forth in claim 7 wherein said first and second restricting means comprise needle valves.

9. A mixing valve as set forth in claim 5 wherein said spool valve is operative to maintain the pressure of said first fluid upstream of said first adjustable orifice substantially equal to the fluid pressure of said second fluid upstream of said second adjustable orifice.

10. A mixing valve as set forth in claim 1 further comprising first and second means for adjusting said first and second adjustable orifices respectively.

11. A mixing valve as set forth in claim 10 wherein said first and second adjusting means are selectively interconnected whereby adjustment of one of said first and second adjustable orifices will result in an adjustment of the other of said first and second adjustable orifices such that the mixing ratio of said first and second fluids are maintained substantially constant.

12. A mixing valve as set forth in claim 11 wherein the change in open area of said first and second adjustable orifices is substantially constant for each increment of adjustment over the entire range of adjustment of said first and second orifices.

13. A mixing valve as set forth in claim 11 wherein said first and second adjustable orifices are rotatably adjustable and said first and second adjustment means includes rotatable shafts extending outwardly from said housing and knobs secured to said shaft, said knobs including gear teeth on the periphery thereof positioned in mutual meshing engagement whereby rotation of one of said knobs will operate to effect a corresponding rotational movement of the other of said knobs.

14. A mixing valve as set forth in claim 13 wherein one of said knobs is axially movable with respect to said rotatable shaft whereby said gear teeth on said one of said knobs is moved out of engagement with the gear teeth on the other of said knobs to thereby enable said first and second adjustable orifices to be independently adjusted.

15. A mixing valve as set forth in claim 14 further comprising biasing means operative to urge said one of said knobs into a position wherein said gear teeth are in meshing engagement.

16. A mixing valve as set forth in claim 1 further comprising a first rapid acting on/off valve within said housing for controlling fluid flow entering from said first fluid inlet and second rapid acting on/off valve means within said housing for controlling fluid flow entering from said second inlet.

17. A mixing valve as set forth in claim 16 further including means for simultaneously actuating said first and second on/off valves.

18. An adjustable ratio mixing valve for mixing a first fluid supplied at a first pressure with a second fluid supplied at a pressure higher than said first fluid at a desired volumetric ratio comprising:
a housing;
a discharge port provided in said housing;
a first fluid inlet provided in said housing;
a first orifice disposed within said housing for metering flow of said first fluid from said first inlet to said discharge port;
a second fluid inlet within said housing;
a spool valve movably disposed within a bore provided in said housing, said spool valve including means defining a variable orifice;
a second orifice disposed within said housing for metering flow of said second fluid from said second inlet to said discharge port, said variable orifice being positioned in the flowpath of said second fluid between said second inlet and said second orifice;
first passage means for placing one end of said bore in fluid communication with said first fluid adjacent said first inlet;
second passage means for placing the other end of said bore in fluid communication with said second fluid between said variable orifice and said second orifice whereby the pressure of said first fluid will operate to urge said spool valve in a direction to increase the size of said variable orifice and the pressure of said second fluid downstream of said variable orifice will operate to urge said spool valve in a direction to decrease the size of said variable orifice, said variable orifice thereby operating to maintain a predetermined relationship between the inlet pressure of said first fluid and the pressure of said second fluid downstream of said variable orifice whereby said first and second orifices may operate to maintain a desired ratio between the flow rates of said first and second fluids through said discharge port without regard to relative changes in the supply pressure of said first and second fluids.

19. A mixing valve as set forth in claim 18 wherein said first and second orifices are adjustable.

20. A mixing valve as set forth in claim 19 further comprising first means external of said housing for adjusting said first adjustable orifice and second means external of said housing for adjusting said second adjustable orifice.

21. A mixing valve as set forth in claim 20 further comprising means selectively interconnecting said first and second adjusting means whereby adjustment of one of said first and second adjusting means will effect a corresponding adjustment of the other.

22. A mixing valve as set forth in claim 21 wherein said interconnecting means comprise gear teeth associated with each of said first and second adjustable orifices and selectively positionable in meshing engagement.

23. A mixing valve as set forth in claim 18 wherein said first orifice comprises a first plate member disposed within a bore provided in said housing having an eccentric opening, and a second plate member disposed within said bore in abutting relationship with said first plate member and having an eccentric opening therethrough, said first and second plate members being relatively rotatable whereby said eccentric opening may be positioned in a desired overlapping relationship and means for securing said first and second plate members in said desired relationship.

24. A mixing valve as set forth in claim 18 wherein said first and second passage means include means for restricting the rate of flow of said first and second fluids into and out of said bore.

25. A mixing valve as set forth in claim 24 wherein portions of said first and second passage means extend through said spool valve and said restricting means comprise orifice inserts fitted in said spool valve.

26. A mixing valve as set forth in claim 24 wherein said restricting means comprise needle valves.

27. A mixing valve as set forth in claim 24 wherein said restricting means compensate for changes in temperature of said first and second fluids.

28. A mixing valve as set forth in claim 18 further comprising first valve means disposed within said housing for allowing flow from said first inlet and second valve means for allowing flow from said second inlet and means for actuating said first and second valves simultaneously.

29. A mixing valve as set forth in claim 28 further comprising a third valve means associated with said discharge port for controlling flow out of said housing, said third valve being actuable simultaneously with said first and second valves.

* * * * *